United States Patent [19]

Scola et al.

[11] Patent Number: 5,742,037

[45] Date of Patent: Apr. 21, 1998

[54] METHOD AND APPARATUS FOR HIGH SPEED IDENTIFICATION OF OBJECTS HAVING AN IDENTIFYING FEATURE

[75] Inventors: Joseph R. Scola, Medfield; David Y. Li, West Roxbury, both of Mass.

[73] Assignee: Cognex Corp., Natick, Mass.

[21] Appl. No.: 612,032

[22] Filed: Mar. 7, 1996

[51] Int. Cl.[6] ............................................. G06K 7/10
[52] U.S. Cl. ................................ 235/454; 235/462
[58] Field of Search ............................ 235/454, 462, 235/463

[56] References Cited

U.S. PATENT DOCUMENTS

| 5,134,272 | 7/1992 | Tsuchiya et al. | 235/462 |
| 5,384,452 | 1/1995 | He | 235/462 |
| 5,489,769 | 2/1996 | Kubo | 235/462 |
| 5,504,319 | 4/1996 | Li et al. | 235/462 |
| 5,525,787 | 6/1996 | Kubo | 235/462 |
| 5,545,887 | 8/1996 | Smith et al. | 235/462 |

*Primary Examiner*—Donald T. Hajec
*Assistant Examiner*—Karl Frech
*Attorney, Agent, or Firm*—Lappin & Kusmer

[57] ABSTRACT

A method and apparatus for identifying an object having an identifying feature includes a two step process for detecting the identifying feature. The process involves locating the feature based upon a first characteristic of the feature and then verifying that feature is the identifying feature based upon a second characteristic of the feature. Preferably, the first step of the process is less discriminating and substantially faster than the second step. This permits the process to be performed rapidly without reducing accuracy.

15 Claims, 13 Drawing Sheets

METHOD AND APPARATUS FOR HIGH SPEED IDENTIFICATION OF OBJECTS HAVING AN IDENTIFYING FEATURE

FIELD OF THE INVENTION

This invention relates to a vision system for identifying an object based upon known characteristics of the object. More particularly, the invention relates to a method and apparatus for analyzing an image of an object and identifying or classifying the object based upon a unique feature identified in the image of the object.

BACKGROUND OF THE INVENTION

Automated manufacturing techniques are dependent upon material handling equipment and processes which the transport parts and material through various stages of the manufacturing process. At various points throughout the process it is often necessary to identify or classify the parts or subassemblies in order to route them to the next stage or eject them because they were incorrectly routed to the wrong stage in the manufacturing process. In other fields, such as shipping and distribution, packages need to be identified and classified based upon their intended destination. In any of these environments, it is desirable that the item or items are processed as accurately and as rapidly as possible.

For example, canned beverages are produced in a process wherein an empty can is formed and then painted with a specific label design corresponding to a particular beverage. The empty painted can is then filled with corresponding beverage and the top is sealed in place. It is desirable to avoid inadvertently filling a can with one beverage that is labeled to be filled with another. It is even more desirable to avoid inadvertently filling a soft drink can with an alcoholic beverage. To avoid these problems it is necessary to verify that the label on the can corresponds to the indicated beverage. Incorrectly labeled cans are ejected from the process before they can be filled.

The problem of visually identifying objects in a stream becomes more complicated when one considers that the objects are processed at high rates, therefore the system must identify the object as rapidly as possible. Often, adjacent objects are in contact with each other, thus obscuring at least a portion of the object. The outer surfaces of the objects can be irregular, for example, fluted containers are being developed because they allow less material to be used without any loss in necessary container strength. The outer surface of an object may be shiny and the image of one object may be reflected onto an adjacent object or the light source may reflect directly into the camera thus washing out at least a portion of the image of the object.

Accordingly, it is an object of this invention to provide an improved method and apparatus for identifying an object based upon an identifying feature of the object.

It is another object of this invention to provide an improved high speed method and apparatus for identifying an object based upon an identifying feature of the object.

It is a further object of this invention to provide an improved method and apparatus for identifying an object based by locating an identifying feature in an image of the object.

It is yet an object of this invention to provide an improved method and apparatus for identifying an object based upon an identifying feature of the object, wherein the feature is non-planar or the feature is located on a non-planar or irregular surface.

SUMMARY OF THE INVENTION

The invention is directed to a method and apparatus for identifying an object having an identifying feature. The method includes a two step identification process wherein a first comparison of a first, less discriminating characteristic is performed to determine if the detected feature could be an identifying feature. If the detected feature is within a predefined tolerance, a second comparison of a second, more discriminating characteristic is performed to verify that an identifying feature has been detected. The advantage of this method is that it can be performed extremely rapidly because the first comparison, which can be performed quickly, allows the system to evaluate a large set of possible features in a short period of time. Only those features which are more likely to be the identifying feature are evaluated using the more discriminating, but also more time consuming, second comparison characteristic.

An identifying feature is any feature that may be utilized to identify and distinguish an object from other objects or to classify an object as a member of a class of objects and distinguish it from other classes or similar objects. Objects, such as packaged consumer goods, shipping containers and packages and even raw materials, are routinely provided with features which can be used to identify the object. These features include indicia, such as part numbers and barcodes as well as physical or structural features which permit an object to be identified.

The process of identifying an object includes creating an image of the object. In environments where the orientation of the object cannot be controlled, the identifying feature can be randomly located in the image of the object. However, if the location of the identifying feature on the object is known, a path through the image can be determined which intersects the identifying feature.

The identifying feature is located by sampling one or more portions of the image and comparing a first characteristic of a sampled portion to a corresponding characteristic of the identifying feature of the object. The locations of the sampled portions in the image are spaced apart by a predefined sampling distance across the image in a first predefine direction. Preferably, the sampling distance is selected to be less than the dimension of the identifying feature in the first predefined dimension to insure that at least one of the locations of the sampled portions intersects the identifying feature. In one embodiment, the sampling distance is chosen to be less than one half the dimension of the identifying feature of the first predefined dimension.

A feature is located when it is determined to have a first predefined characteristic that is at least similar to the corresponding characteristic of the identifying feature within a predefined tolerance. After a feature having a similar first characteristic to the identifying feature is located in the image, a second characteristic of that feature is normalized and compared to a corresponding characteristic of the identifying feature of the object. The normalizing process removes any optical scaling effects that might cause the image to be optically magnified or reduced by scaling the characteristic into a predefined range.

The normalized second characteristic of the located feature is then compared with a corresponding characteristic of the identifying feature to determine a match within a predefined tolerance. If a match is determined, the process is terminated and the system waits for the next object. If a match is not determined, the process is repeated at each of the next sampling location until one of three possible conditions occurs: 1) a match is determined and the object is deemed identified; 2) No match is determined and the object is rejected; or 3) a predefined time limit for determining a match expires and the object is rejected.

In one embodiment, a training image of a model object containing an identifying feature is created and used to produce a template or a reference data set for later comparison with a located feature. In this embodiment, the identifying feature is located by sampling the image along a predefined path at predefined intervals. A predefined first characteristic of the located feature is compared with the corresponding characteristic for the identifying feature. If it is determined that the first characteristic of the located feature is similar to the corresponding characteristic of the identifying feature within a prescribed tolerance, at least a portion of a second predefined characteristic of the located feature is compared to a corresponding portion of the corresponding characteristic of the identifying feature. A match of the second predefined characteristic indicates that the identifying feature may have been found. A second located is sampled at a first offset position in a first direction along the predefined path and the process is repeated to confirm that the identifying feature is found. The offset distance is substantially small to insure that the sampled location intersects the identifying feature. If a match is not found in the second offset position, that position is presumed to be beyond the edge of the identifying feature. In this case, a second offset position in the opposite direction of the first offset position with respect to the sampled location is sampled. A match confirms the identification, a non-match or failure to confirm indicates the identifying feature is not found and the process will continue at the next sampling location.

After the match is confirmed, the second predefined characteristic of the located feature is normalized and a representation of the normalized, second predefined characteristic is stored as a template. The template can be used in comparisons with the a normalized, representation of the same characteristic of a located feature to determine whether an identifying feature has been found.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

Figure 1:
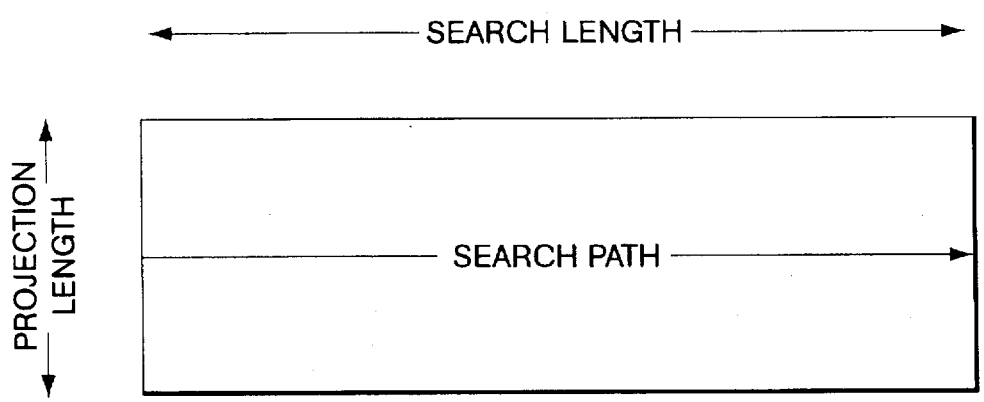
FIG. 1 is a diagram of a Caliper Window.

An image of an object consists of a set of discrete elements or pixels having intensity values representative of the intensity of light reflected by a corresponding portion of the object and, in the case of a color image, color values representative of the color of light reflected by the corresponding portion of the object. An edge, as used herein, is defined as a change in intensity value over a predefined threshold either from light to dark or from dark to light or a change in color value over a predefined threshold from one color to another. An edge may span several pixels. The polarity of an edge is an indication of whether an edge is a transition from dark to light, positive polarity or light to dark, negative polarity. An edge is represented by two or more adjacent pixels where the difference in pixel values is grater than the threshold. Each feature of an object in an image can be characterized by the quantity and spacing of the edges along a specified path across that feature.

An identifying feature is a feature that serves to identify and distinguish one object from another. Examples of identifying features include part number indicia, barcodes and universal product codes (UPC) as well as trademarks and other logos. These features may be affixed to the object, such as by painting or via a label or they may be physically imposed in the structure of the object. In addition, an identifying feature may be a defect in one object that distinguishes it from another object that would be essentially identical but for the defect.

In a preferred embodiment, the identifying feature is initially identified by evaluating a first characteristic: the quantity of edges along a predefined path in a sampled location of the image of an object. If the first characteristic is within a predefined range, a second characteristic is evaluated to confirm the identification of the feature. In this embodiment, the second characteristic is the distance between the respective edges along the predefined path in a sampled location of the image of an object. This second characteristic can be normalized along the predefined path to remove the effects of magnification on the image of the feature being evaluated.

In the preferred form of the invention, this process is accomplished by creating an image of the object and applying a conventional image analyzing tool to portions of the image suspected of containing a representation of the identifying feature. The tool is used to analyze an area of the image and determine the number of edges and the spacing between the edges along an elongated region, or path in the sampled location. These values are compared with predefined characteristic values of the identifying feature to locate and identify the feature.

The predefined or reference characteristic values of the identifying feature can determined either by empirical means or derived from a known specification of the feature. The empirical method includes the steps of creating an image of the object and locating the portion of the representation containing the feature. Using the conventional image analysis tools, the portion of the image containing the feature can be analyzed to determine the representative characteristics of the feature.

One conventional image analysis tool that can be used to locate edges in an image is the Caliper Tool, available from Cognex Corporation, Natick, Mass. The Caliper Tool is a computer program which has its function modeled after the mechanical engineer's caliper, a precision device for measuring distances. It is utilized by specifying a distance between the caliper "jaws" and the Caliper Tool searches a specified area for edge pairs separated by the specified distance. It can also search for individual edges when given their approximate location in an image. This is analogous to using a caliper to measure depth.

The Caliper Tool is applied to a portion of an image defined by a Caliper Window, an area in which the Caliper Tool searches for edges. As shown in FIG. 1, the Caliper Window is defined by a search length and a projection length, which are the width and height, respectively, of the window. The Caliper Tool searches along the search path to detect edges and returns a list of pixel locations corresponding to edge locations relative to the Caliper Window. In order to increase processing speed, the Caliper tool may be configured to find edges of one polarity. In one preferred embodiment, the Caliper Tool is configured to find only edges of negative polarity.

The invention is directed to a method and a system for identifying objects having an identifying feature. In accordance with one preferred embodiment, the system 10 is used to identify objects, such as beverage cans of different brands, in a succession of such objects for example as might exist on a conveyor belt in a manufacturing process. By way of example, the objects may be empty beverage cans being transported toward a filling station. A UPC barcode on the object serves as an identifying feature.

Figure 2:
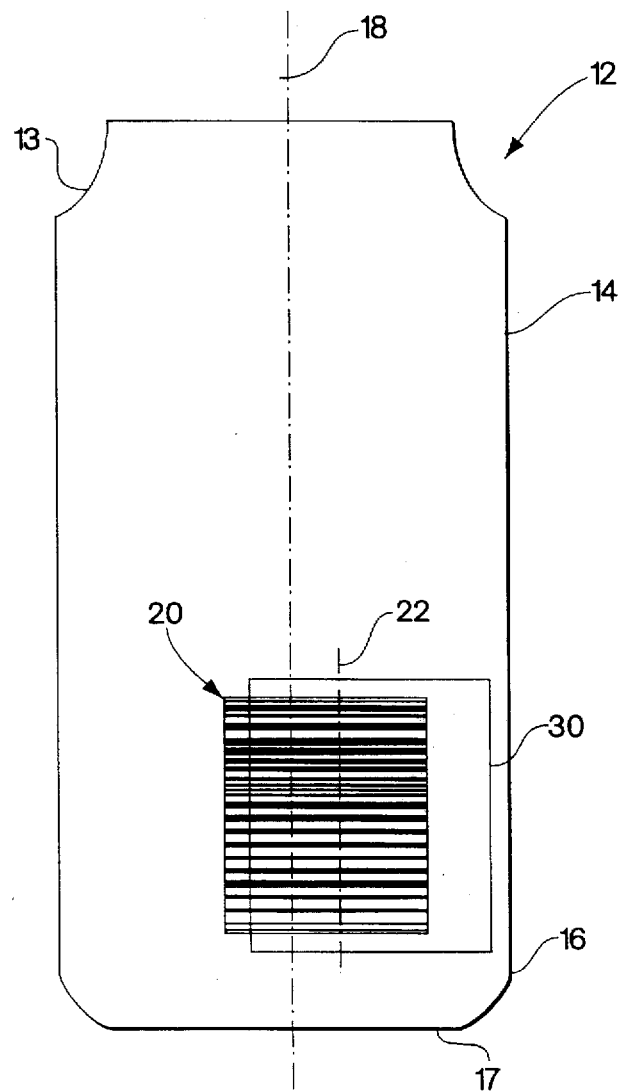
FIG. 2 is a diagram of an object having an identifying feature in accordance with the invention.

FIG. 2 shows an exemplary object in the form of a beverage can 12 having a UPC barcode 20. The barcode 20 is located on outer surface 14 of the can 12 adjacent the bottom edge 16 of the outer surface 14. The barcode 20 consists of predefined pattern of varying thickness bars separated by spaces of varying dimension. The pattern extends along a scanning axis 22, the same axis along which the barcode 20 can be read. In this preferred embodiment, the scanning axis 22 is substantially parallel to the cylindrical axis 18 of the can 12. Also shown in FIG. 2 is a imaging window 30 representing the field of view of the imaging system 60 (shown in FIGS. 3 and 4) used to produce an image of the portion of the can 12 most likely to contain a barcode 12. Depending upon the orientation of the can 12 about axis 18 (which is typically random) and height of the barcode, one or more imaging systems 60 may be necessary to locate the barcode 12.

Figure 3:
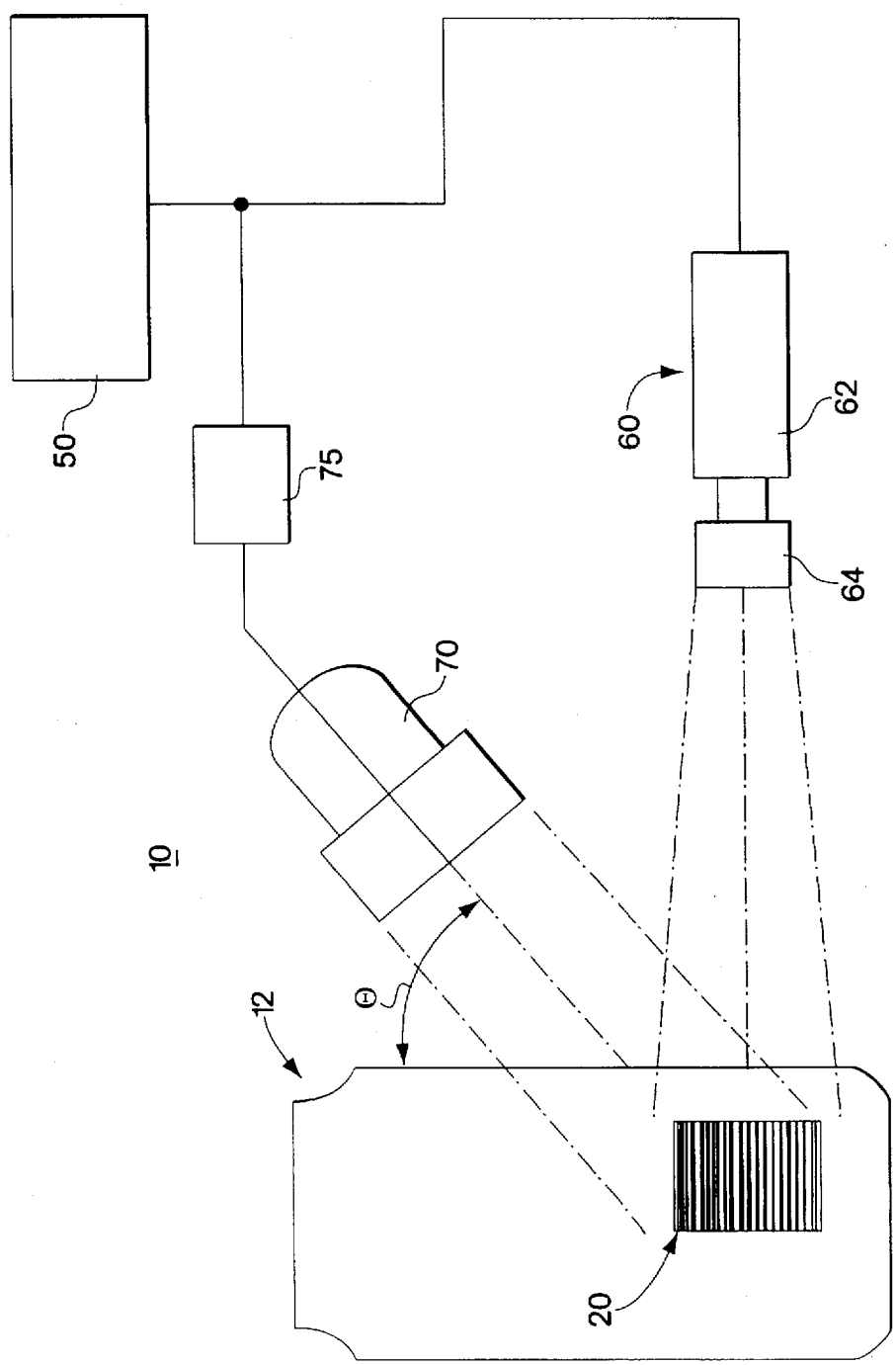
FIG. 3 is a side view diagram of a system for identifying the object of FIG. 2 in accordance with the invention.

FIG. 3 shows a system 10 for identifying a beverage can 12 in accordance with the invention. The system 10 consists of an image processing system 50, an imaging system 60 and a light source 70. The image processing system 50 includes a computer system and an image digitizing system for generating, storing and processing digital images produced by the imaging system 60. In the preferred embodiment, the image processing system 50 is a Cognex 4400 Machine Vision System available from Cognex Corporation, Natick, Mass.

The imaging system 60 includes at least one video camera 62 having sufficient resolution to discern the edges of the barcode. The imaging system 60 is coupled to the image processing system 50. In the preferred embodiment, the video camera 62 is a Sony XC-75 video camera, available from Sony Corp., Tokyo, Japan. In order increase the performance of the system by speeding up the image acquisition time, the Sony XC-75 cameras are configured to remain in half-resolution field acquire mode. The cameras are equipped with a 25 mm Cosmicar 1:1.8 f-stop type lens, available from Cosmicar a division of Pentax, Tokyo, Japan.

The light source 70 includes a focused light source or light line for limiting the illumination to a well defined area. The light source is focused or directed to illuminate only the portion of the object being imaged. In the preferred embodiment, each light source is a 4 inch Fostec fiber optic light line available from Fostec Corp. of Auburn, New York.

In the case of beverage cans, the barcode may be printed using white paint on a bare aluminum background. This presents a problem because the image of the barcode becomes washed out by the direct reflection of the light source. This problem can be avoided by orienting the light source at an angle θ to the surface of the can as shown in FIG. 3 such that the light from the light source 70 does not reflect directly in the camera 62. Preferably, the angle θ is between 30 and 55 degrees.

In this embodiment, the objects can be transported at a very high rate past the system 10 which is likely to cause blurring of the image generated by camera 62. To avoid this problem, the light source 70 can be coupled to a strobe 75 to strobe the light source and eliminate blurring. In the preferred embodiment, the strobe 75 is an EG&G 2020C Strobe available from EG&G, Salem, Mass.

Figure 4:
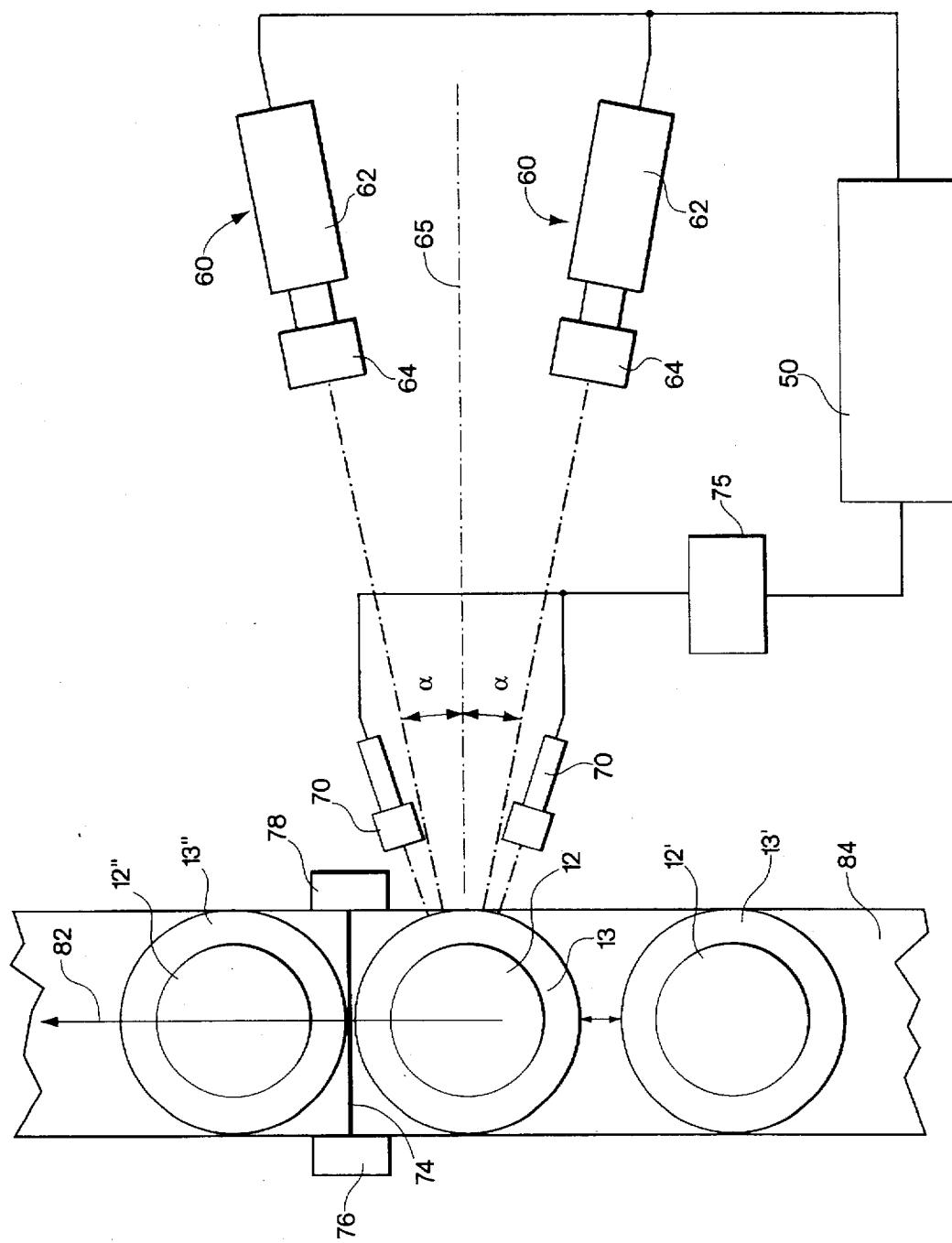
FIG. 4 is a top view diagram of the system of FIG. 3.

FIG. 4 shows a top view of the system shown in FIG. 3. The number of cameras 62 used to acquire images of the object is selected based upon several factors. Specifically, the field of view, the camera resolution, the size of the feature and the size of the object are considered in determining the number of cameras necessary to image a sufficient portion of the object to locate the identifying feature. Preferably, the number of cameras should be sufficient to produce images of all possible areas where the identifying feature could be found. In the preferred embodiment, four cameras 62 are used and each acquires an image of approximately one quarter of the object. As shown in FIG. 4, the succession of objects (2 cans 12 and 12') is traveling along axis 82 on a conveyor 84. The system 10 is symmetric with respect to axis 82 and only one side of the configuration is shown.

Each side of the system includes two cameras 62 and two light sources 70. Preferably, each camera 62 is oriented to cover approximately one quarter of the whole can outer surface 14 in its field of view. Each camera 62 is offset by an angle α from axis 65 through the center of the object. In the preferred embodiment, angle α can be approximately 8–12 degrees. In addition, the light sources 70 corresponding to each camera 62 are also offset with respect to axis 80. Preferably, the light sources 70 are offset by a different angle than the camera 62 in order to avoid direction reflection of the light source 70 into the camera 62. In the preferred embodiment, each light source 70 is offset from the angle of the corresponding camera 62 by 12–20 degrees.

As shown in FIG. 2, for the case of the illustrated beverage can, each can 12 has a neck portion 13 that is smaller in diameter than the body of the can 12. As shown in FIG. 4, the neck provides a space of length D in the direction of axis 82 between cans in contact with each other for an optical beam 74 to sense the beginning of each can. The optical beam source 76 and appropriate sensor 78 can be coupled to the image processing system 50 to trigger the strobe 75 to acquire the image of each can 12.

Figure 5:
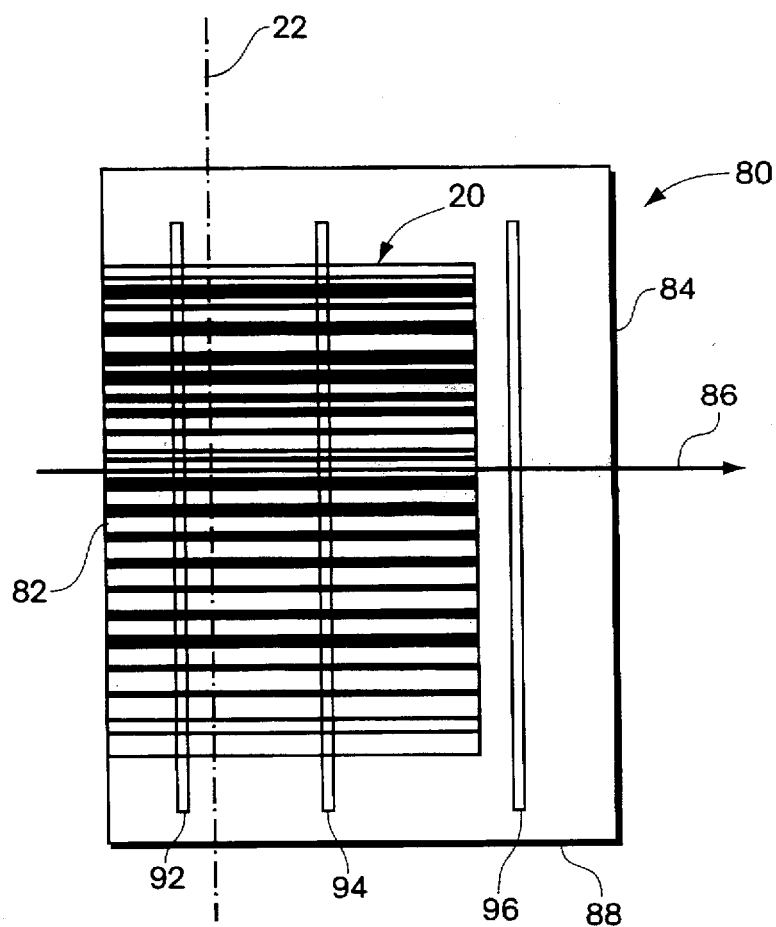
FIG. 5 is a diagram of an image showing caliper sampling locations in accordance with the invention.

FIG. 5 shows an image frame 80 acquired by one camera. The image frame 80 is composed of a matrix of pixel intensity values stored in the memory of the image processing system 50. The content of the image frame 80 as reflected by the field of view of the camera 62 is selected based upon the predefined position of the barcode 20 on the outside surface 14 of the can 12. In the preferred embodiment, the barcode 20 is located approximately one half inch above the bottom 17 of the can and therefore, the bottom edge 88 of the image frame 80 is positioned slightly less than one half inch above the bottom 17 of the can 12. The frame 80 is 256 pixels wide by 240 pixels high.

The image processing system 50 applies the Caliper Tool to predefined elongated sampling locations 92, 94, 96 along the predefined sampling path 86 across the image frame 80. Preferably, the distance between adjacent sampling locations 92, 94, 96 and the distance between the frame edges 82, 84 and the adjacent sampling location is selected to be less than the barcode width to insure that at least one sampling location intersects the barcode. The barcode width is the dimension of the barcode in the direction along the sampling path 86, perpendicular to the scanning axis 22. In the preferred embodiment, the distance is selected to be less than one half the barcode width to insure that at least two sampling locations intersect the barcode. This has been found to be advantageous because it is possible that artifacts, such as from reflections, or defects, such as scratches, can cause one sample to be incorrectly rejected. In the preferred embodiment, as shown in FIG. 5, there are at least three sampling locations in each frame. The number of sampling locations per frame can be increased, for example to five sampling locations, to increase the likelihood of finding the barcode but at the expense of increased processing time necessary to evaluate the additional sampling locations.

In the preferred embodiment, the Caliper Windows at sampling locations 92, 94, 96 are 5 pixels wide (along the projection length) and 150–200 pixels long (along the search length). The length (along the search length) is variable and dependent upon the length of the barcode along the scan axis 22. In the preferred embodiment, the beverage cans include either an 6 character or a 12 character barcode and the length of the Caliper Window is 150 or 200 pixels, respectively.

Figure 6:
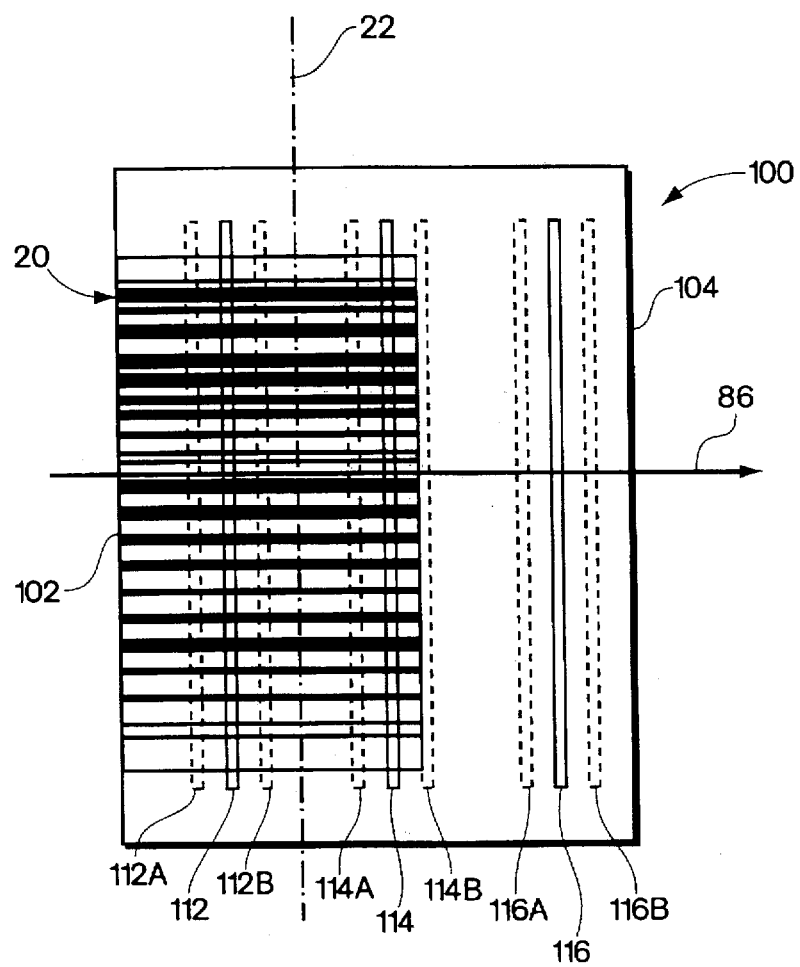
FIG. 6 is a diagram of a training image showing caliper sampling locations and offset positions in accordance with the invention.
Figure 7:
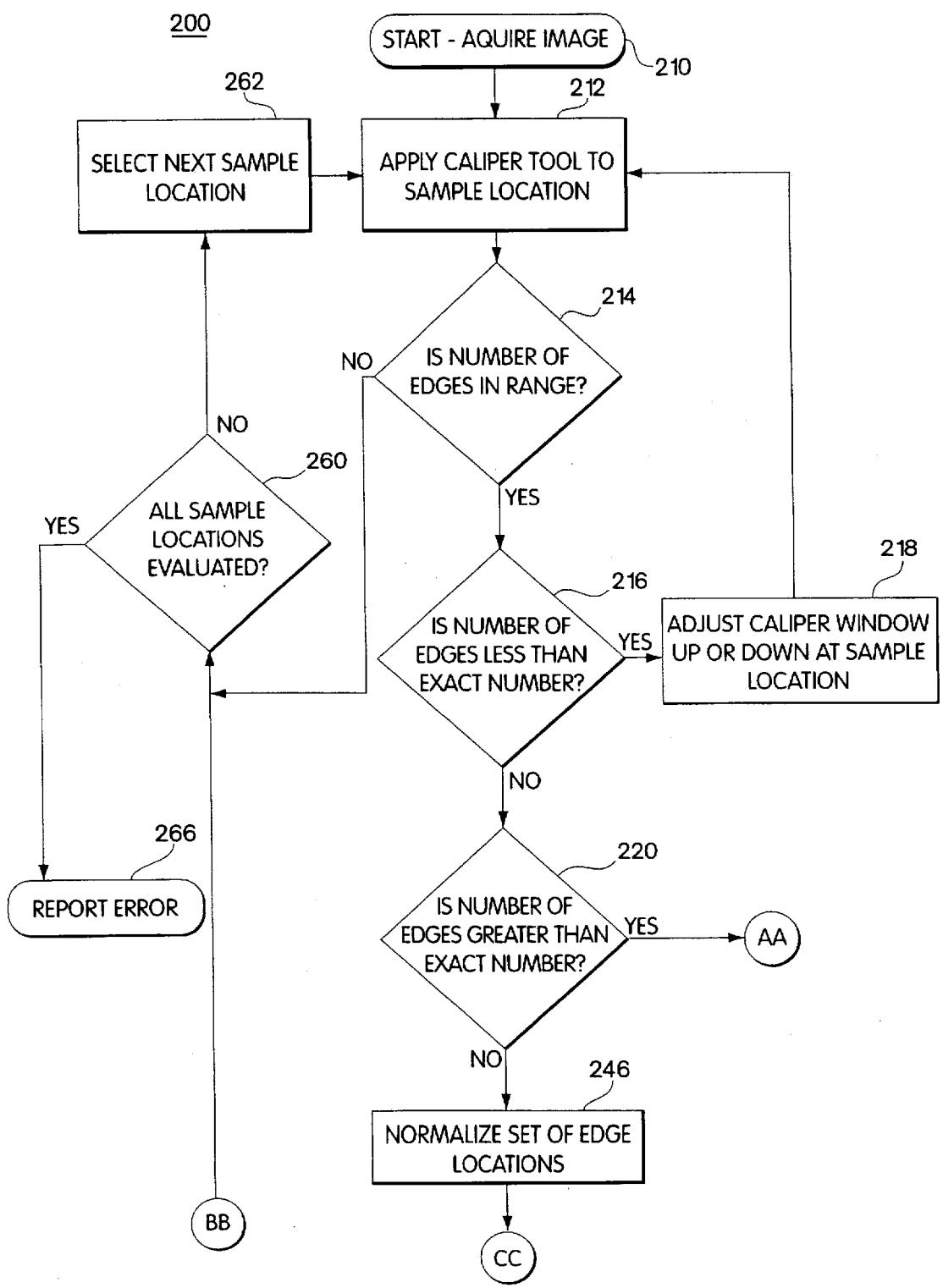
FIGS. 7–10 are a flow diagram of a training process for acquiring characteristic information of an identifying feature in accordance with the invention.
Figure 8:
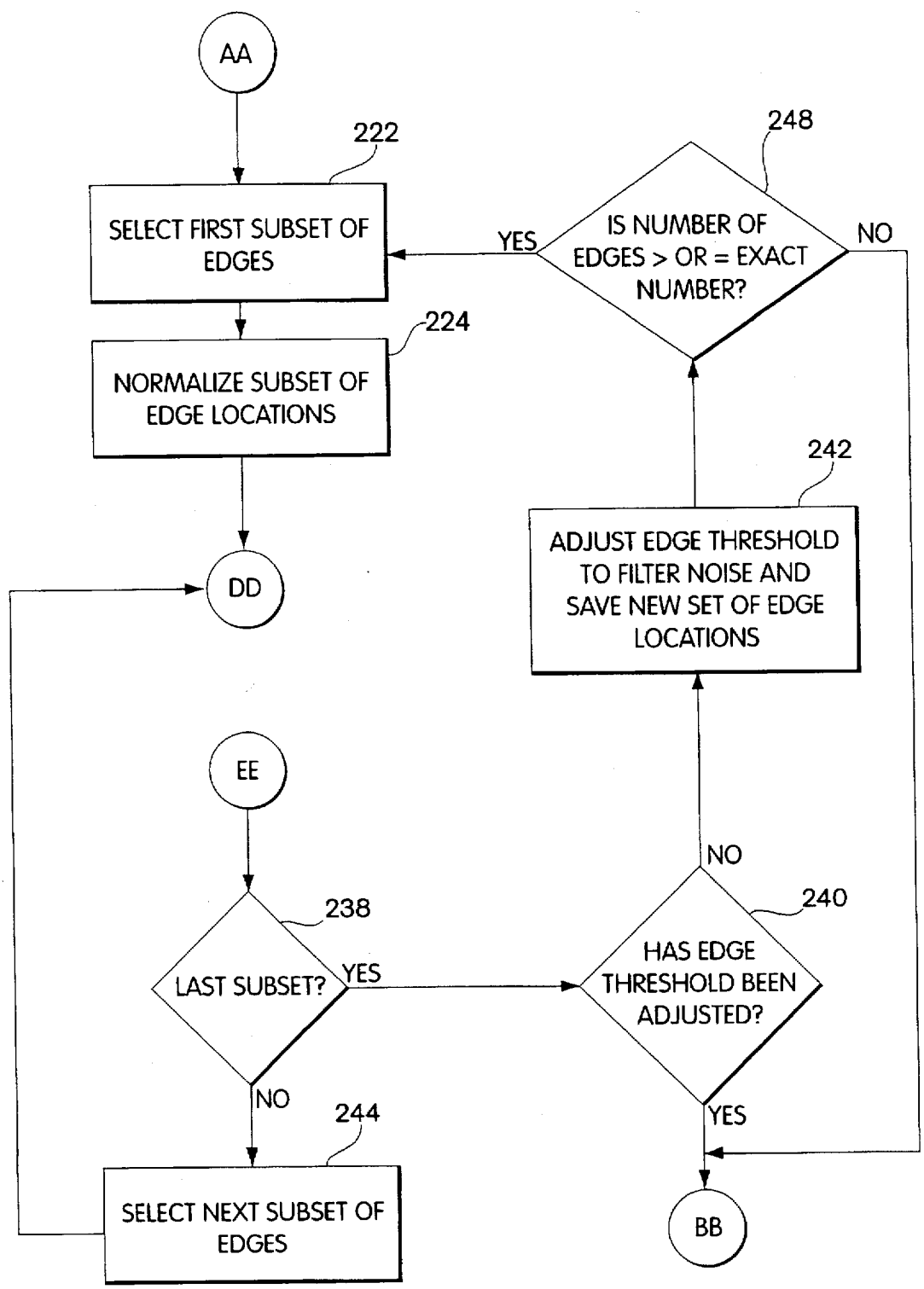
Figure 9:
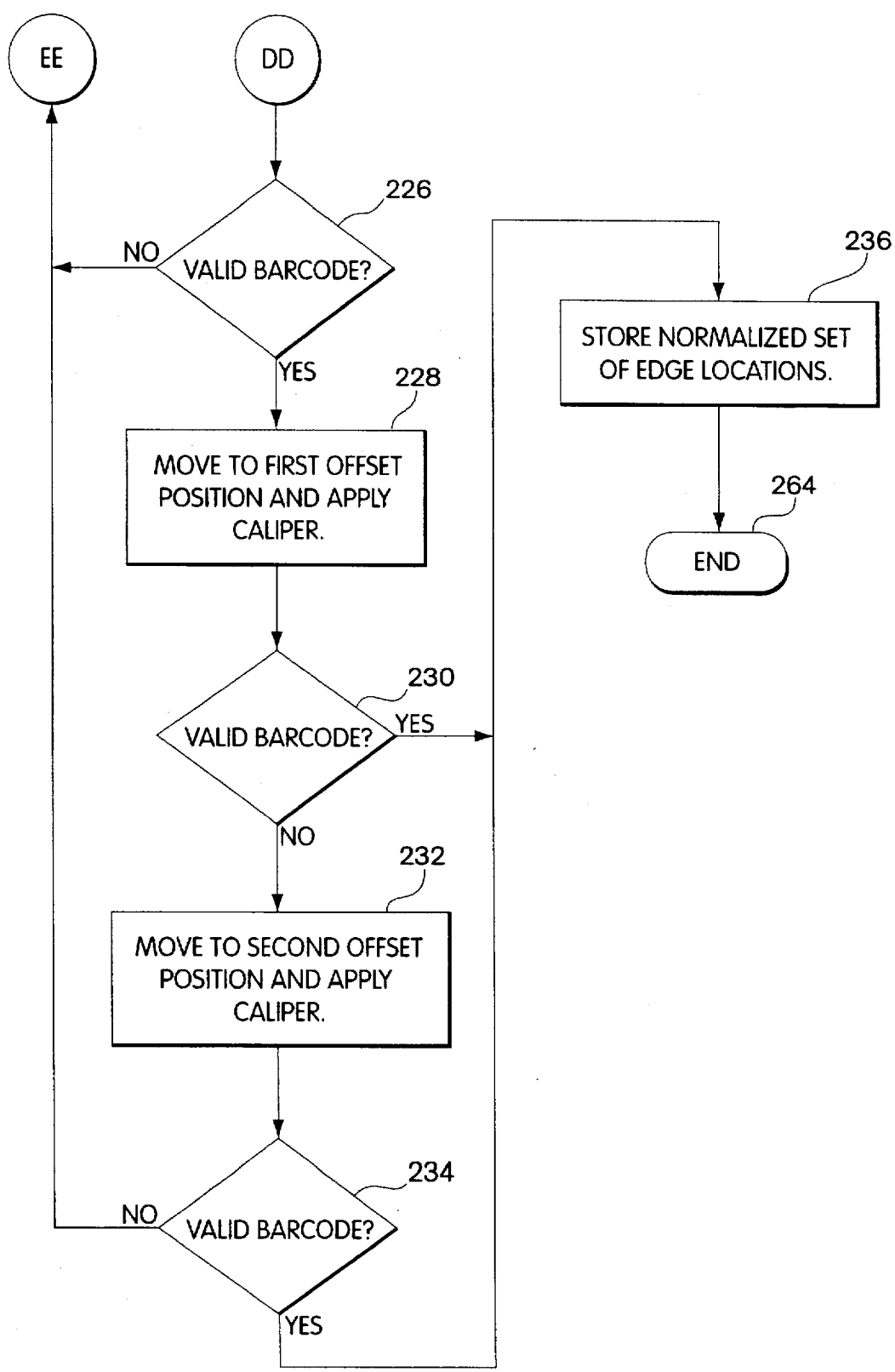
Figure 10:
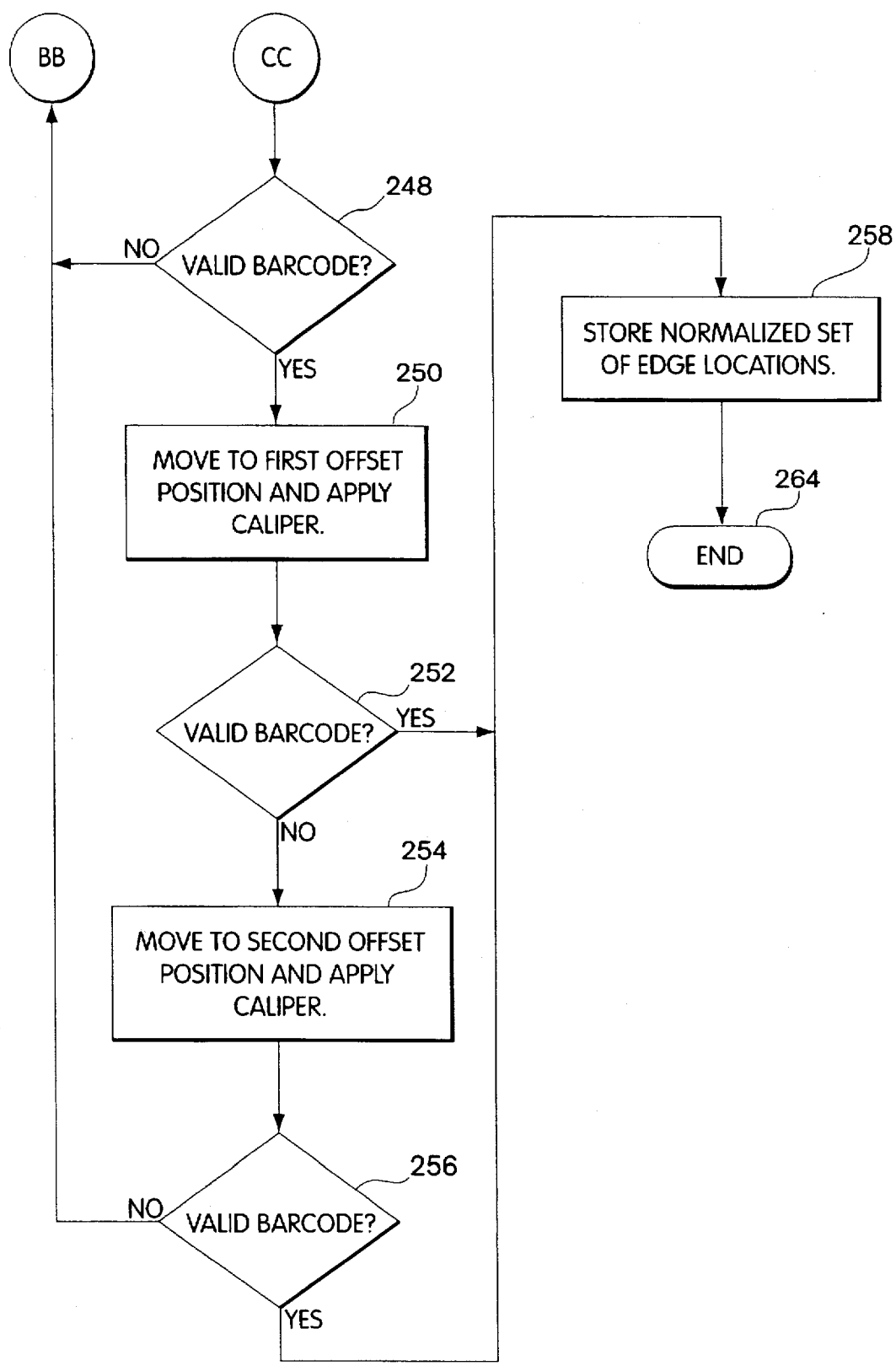

FIG. 6 shows a training image frame 100 acquired by one camera. The training process is a method by which the system acquires and stores the characteristics of the identifying feature which will later be compared to characteristics of an object being evaluated. The training image frame 100 is similar to image frame 80, except that the training image frame includes offset Caliper Windows at sampling locations 112A, 112B, 114A, 114B, 116A, 116B, in addition to Caliper Windows at sampling locations 112, 114, 116. The offset Caliper Windows at sampling locations 112A, 112B, 114A, 114B, 116A, 116B, are used to verify that a valid barcode has been identified.

According to one embodiment of the invention, the system 10 first locates a valid barcode at one of the sampling locations 112, 114, 116 and then evaluates the respective offset Caliper windows at sampling locations 112A, 112B, 114A, 114B, 116A, 116B to verify that the same barcode is identified. As shown in FIG. 6, it may be necessary to test both locations because it is possible that one of the offset Caliper Windows 114B is adjacent the edge of the barcode without intersecting it. In this situation, the other offset Caliper Window 114A is used to verify that a valid barcode is identified. In the preferred embodiment, the offset Caliper Window locations are offset by 7 pixels from the sampling locations.

In the preferred embodiment, the system includes four cameras each acquiring an image of approximately one quarter of the total outer surface of the can. Because it is possible that adjacent cans may be in contact with one another, there exists a small portion in the front and back of each can that can be obscured by the adjacent can. As long as the barcode width is greater than the width of the obscured area, at least a portion of the barcode will appear in the image frame 80 or training image frame 100. For each can, four image frames are created and twelve sampling locations are defined.

The method of identifying the object includes training the system to identify and store reference characteristic information of that barcode and scanning objects to verify that they include the identifying barcode. The training process is used to create reference characteristic values of the barcode to be identified. These reference characteristic values are used in the scanning process to locate and identify the barcode of a production run of cans. Any can that does not have the matching barcode is ejected from the run.

FIGS. 7–10 show a flow diagram of the training process. The training process 200 includes the steps of acquiring one or more images of the object at 210. Each sampling location is evaluated in sequence until a valid barcode is identified. The Caliper Tool is applied to each location at 212 and a list of edge locations is created for the area inside the Caliper Window along the Search Path. The number of edges found is evaluated at 214 to determine if it is in the range of values for a possibly valid barcode. If the number of edges is not within the acceptable range, the system looks to for the next sample location at 260 and selects the next location at 262. If all the sample locations have been considered at 260, the system will report an error at 266.

If the number of edges is less than the number of edges for a valid barcode at 216, the sampling location is adjusted along the search path at 218, the process returns to step 212 and the Caliper Tool is applied to the new sampling location. The sampling location can be adjusted in one direction along the search path until a match occurs or the edge of the frame is reached and then adjusted in the opposite direction until the edge of the frame is reached. In the preferred embodiment, the sampling location is adjusted up, in the search direction, 7 pixels and if the barcode is not matched, the sampling location is adjusted down 7 pixels. If the no match is found, the system locates the next sample location and continues the process.

If the number of edges is greater than the number edges in a valid barcode at 220, the system can evaluate each subset of edges to identify a valid barcode. The system will begin with the first subset of contiguous edges 222 closest to bottom of the frame 88 and continue until all subsets have been considered at 238. Each subset is normalized at 224 and then each subset is evaluated to determine if it is a valid barcode at 226. If a valid barcode is detected at 226, the Caliper Tool is applied to a first offset location at 228 and the first offset location is evaluated to determine if it is a valid barcode at 230. If it is not a valid barcode at 230, the Caliper Tool is applied to a second offset location at 232 and the second offset location is evaluated to determine if it is a valid barcode at 234. If a valid barcode is detected at 230 or 234, the subset of points is normalized and stored at 236 for use in the scanning process.

If the subset of edges is not determined to identify a valid barcode at 226, the system looks to the next subset of edges at 238 and selects the next subset at 244 to enter the process at 226. If, after all the subsets have been considered at 238 and a valid barcode is not detected, the system has the ability to adjust the edge threshold of the Caliper Tool in order filter out noise and false edges at 242. After the threshold is adjusted, a new set of edges is created. If the number of edges is greater than or equal to the exact number of edges at 350, the first subset or the set is considered at 320. If the number is less than the exact number, the system looks to the next sample location. If the last subset has been considered and the edge threshold has been adjusted at 240 and a valid barcode has not been detected, the system looks to the next sample location at 260.

After a set of edges has been located, the set of edge locations is normalized at 224 or 246. The normalizing process removes any optical scaling effects. The normalizing process at 224 or 246 is accomplished by ascertaining the boundaries of the feature and assigning a first value to one boundary and a second value to the other boundary. Each of the intermediate locations in the set are then assigned proportional intermediate values $L_i$. The intermediate locations are assigned values according to the following equation:

$$L_i B+((E-B)\times((V_i-V_B)/(V_E-V_B)))$$

Where

B is the beginning value of the normalized range

E is the ending value of the normalized range $V_B$ is the beginning boundary location value $V_i$ is the intermediate location value $V_E$ is the ending boundary location value.

In the preferred embodiment, B=0 and E'2 1, and the equation above reduces to:

$$L_i(V_i-V_B)/(V_E-V_B)$$

After the set of edges has been normalized in steps 224 or 246, the system evaluates the set of edges to determine if the set of edges represents a valid barcode in steps 226, 230, 234, 248, 252, 256. This can be accomplished by evaluating the first two edge values and the last two edge values which correspond to the start and stop bars present in all valid barcodes. If the normalized locations of the first two edges and the last two edges of the detected feature correspond to the expected, normalized locations of the start and stop bars of a valid barcode, a valid barcode is deemed detected. If the identification of a valid barcode is repeated in either of the subsequent steps 230, 234, 252, 256, the normalized set of edge locations is stored in memory at 236 or 258 of the image processing system for use in later comparisons. If the identification is not repeated, the feature is not deemed a valid barcode.

After a normalized set of edges is been stored in memory at 236 or 258 for use in later comparisons, the system uses this data to further configure the scanning process. In the preferred embodiment, the cans have either an 6 character barcode or a 12 character barcode and the search length of the Caliper Window, the range of edges and the exact number of edges are set based upon the barcode detected in the training process 200. For the 6 character barcode, the search length of the caliper Window is 150 pixels, the ranges of edges is 14 to 21 and the exact number of edges is 17. For the 12 character barcode, the search length of the Caliper Window is 200 pixels, the ranges of edges is 27 to 35 and the exact number of edges is 30.

Figure 11:
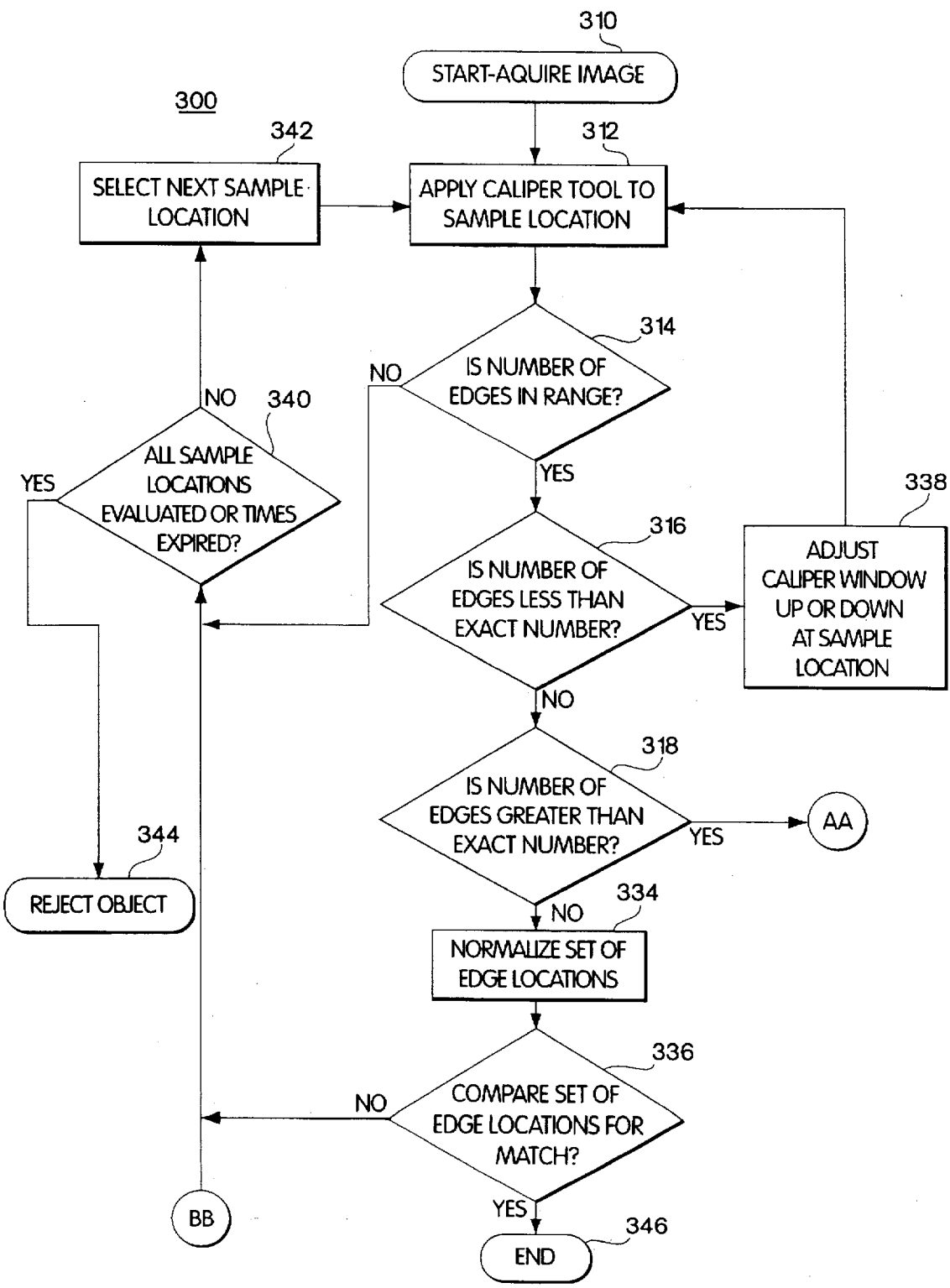
FIGS. 11–12 are a flow diagram of the scanning process for evaluating objects in accordance with the invention.
Figure 12:
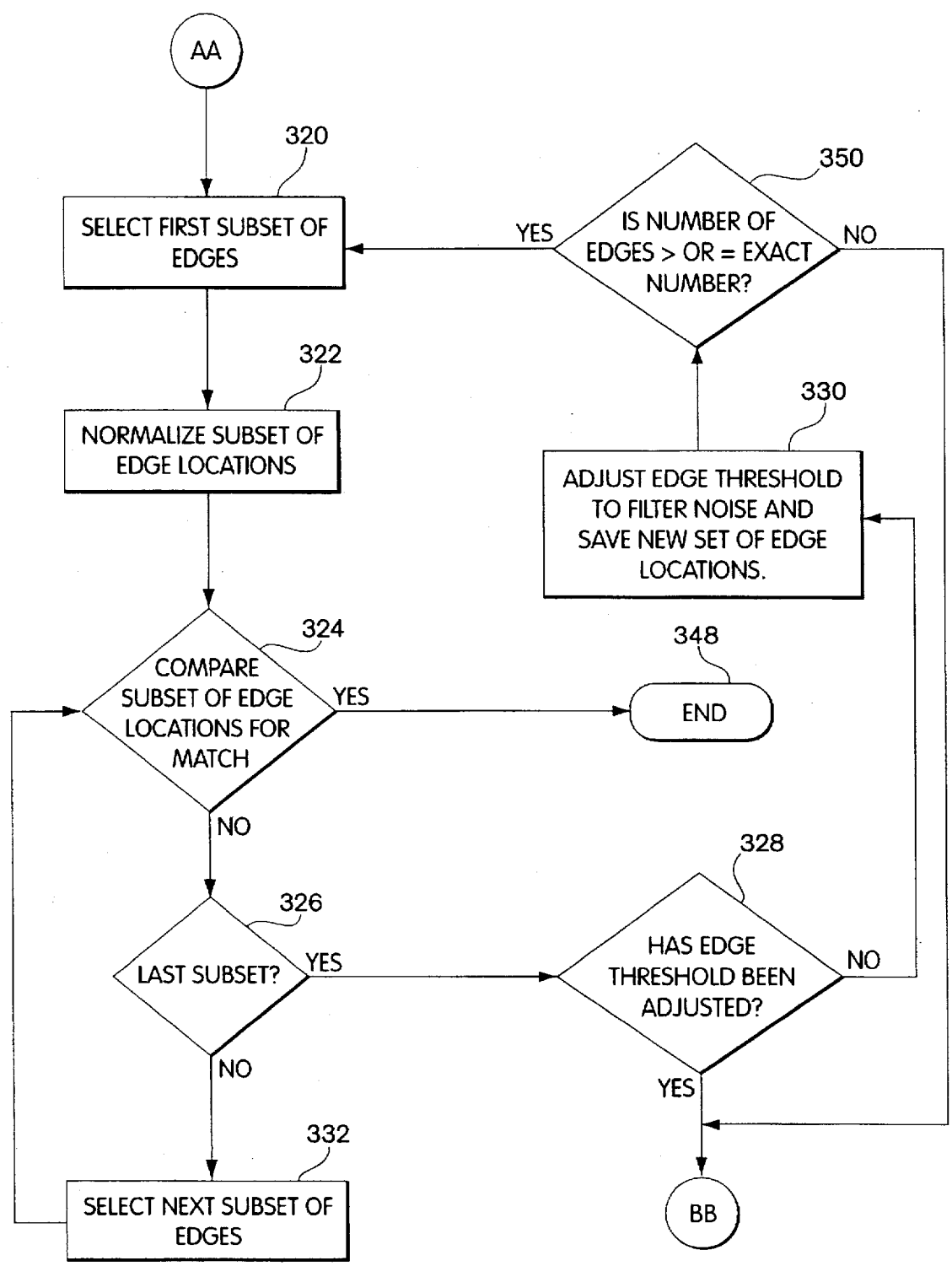

FIGS. 11–12 show a flow diagram of the scanning process 300. The scanning process includes the step of acquiring one or more image frames of the object at 310. Each sampling location is evaluated in sequence until a barcode match is found. The Caliper Tool is applied to each sampling location at 312 and creating a list of edge locations for the area inside the Caliper Window along the Search Path. The number of edges found is evaluated at 314 to determine if it is within the range of values set in the training process 300. If the number of edges is less than the number of edges set in the training process at 316, the position of the Caliper Window at the sampling location is adjusted at 338 along the search path and the Caliper Tool is applied to the new sample location at 312.

If the number of edges is within the range and greater than the number edges set in the training process at 318, the system can evaluate each subset of edges in steps 320–332 to identify a matching barcode. The system will begin at 320 with the subset of contiguous edges closest to bottom of the frame 88 and continue until all subsets have been considered 326.

After a set of edges has been selected at 320, the locations of the edges are normalized at 322 and each normalized location in the set is compared at 324 with the normalized values acquired during the training process. Each value in the set of edges must be within a predefined tolerance of the normalized values acquired during the training process. If all the values are within the predefined tolerance at 324, the system will stop and wait for the next set of images to evaluate at 346. If the values are not within the predefined tolerance, the system look for the next subset at 226. The next set of edges is selected at 332 and considered in turn at 324. The system can include a timer to prevent the scanning process from exceed a prescribed time limit and missing the next can. If the timer expires or no match is found at 340, the can is rejected from the process at 344.

In the condition where more than the exact number of edges is detected at 318, the system can raise the edge threshold applied to the set of edges and contrast values at a given sample location at 330 in order to filter out artifacts caused by noise or scratches on the can. The new, filtered set of edges is created at 330. A first subset of edge locations is selected at 320 and the subset is normalized at 322 and re-evaluated at 324. As described above, in connection with the training process 200, the system can adjust the threshold at steps 328, 330 and 350, one or more times in an attempt to filter out noise.

If the exact number of edges is detected at 318, the set of edges is normalized at 334 and compared with a reference set of edge location values at 336. If each of the edge locations is within a predefined tolerance of the corresponding reference location, the object is accepted and the process ends at 346. If one or more edge locations are not within the predefined tolerance of the corresponding reference location, the system looks for the next sample location at 340. If the next sample location exists, it is selected at 342 and the process continues at 312. If the last sample location has been considered at 340 and no match is found, the can is rejected at 344.

Figure 13:
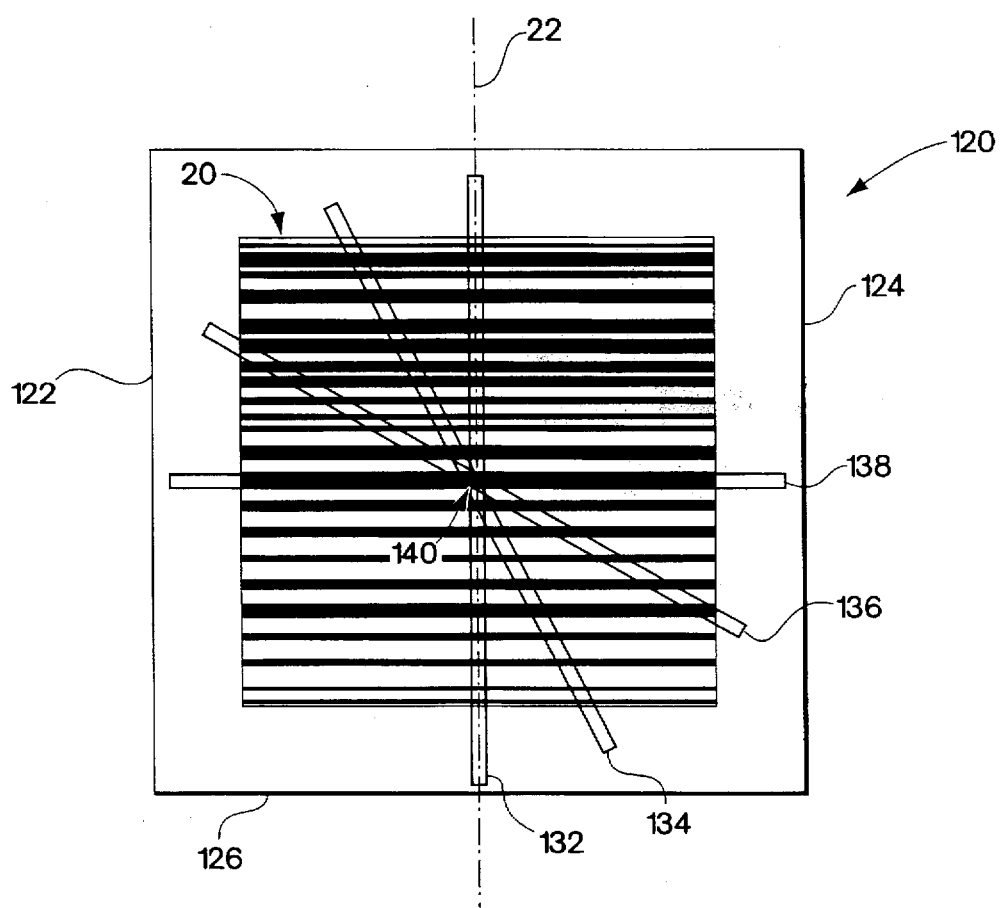
FIG. 13 is a diagram of an image showing caliper sampling locations in accordance with an alternate embodiment of the invention.

In an alternative embodiment, the system can be used to identify a barcode having a substantially constant location in the image frame but having a random angular orientation therein. As shown in FIG. 13, the image frame 120 includes a barcode 20 and Caliper Windows at sampling locations 132, 134, 136 and 138. In this embodiment, the Caliper Windows intersect at a common point 340 and are angularly offset with respect to each other about the common point 340. In the preferred embodiment, the angle between sampling locations is 30 degrees.

The process for identifying a barcode in this embodiment is essentially the same as recited above except that only one image frame is acquired. The system sequentially evaluates each Caliper Window until a match is found. The normalizing process helps compensate for the fact that the search path of the Caliper window is not likely to be exactly parallel with scanning axis of the barcode. For example, the normalized set of edge values from location 132 should be the same as the normalized set of edge values from location 134.

In an alternative embodiment, the system can be configured to enhance the contrast or reduce glare of the image to improve the identification process. This can be accomplished by providing a green filter on the light source and a yellow filter on the camera. Alternatively, the camera can be provided with a polarizing filter or the aperture of the lens can be closed to reduce glare or the effects of reflections between cans. In the preferred embodiment, the effects of a 2 f-stop reduction in aperture has been found to be approximately equivalent to the use of a polarizing filter.

In cases where the object's surface is non-planar or where the objects surface is not perpendicular to the camera, there may exist portions of the objects surface shown in the image that are out of focus. This problem can be compensation for by closing the f-stop on the camera lens to increase the depth of field of the camera. Alternatively, the Caliper Tool edge threshold can be adjusted to compensate for out of focus edges.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method for identifying an object having an identifying feature, said identifying feature having at least one predefined characteristic, said method comprising the steps of:

1) creating a representation of said object;
   2) locating at least one feature in said representation of said object having a corresponding characteristic similar to said at least one characteristic of said identifying feature and creating a second representation of at least one other characteristic of said located feature, the step of locating including the substeps of:
      sampling at least one portion of said representation of said object at a predefined position in said representation, including sampling, including sampling at predetermined locations across said representation of said object in a predefined direction, said locations being spaced apart by a distance corresponding to at least one characteristic of said identifying feature; and
      creating said second representation of said sampled portion of said representation consisting of a representation of at least one other characteristic of said located feature;
   3) normalizing at least a portion of said second representation of said at least one other characteristic of said located feature, to create a normalized representation of said feature;
   4) comparing said normalized representation of said at least one other characteristic of said feature to a predefined representation of a corresponding characteristic of said identifying feature.

2. A method according to claim 1, wherein said distance is less than a dimension of said identifying feature in said predefined direction.

3. A method according to claim 2, wherein said distance is less than one half a dimension of said identifying feature in said predefined direction.

4. A method according to claim 1, wherein said least one portion of said representation of said object comprises a window having a substantially narrow width and a length substantially longer than said identifying feature in a corresponding direction in said representation of said object.

5. A method according to claim 1, wherein said at least one characteristic includes a total quantity of edges in said sampled portion of said representation at a predefined position in said representation, and wherein said step of locating said at least one feature includes the substep of: comparing said total quantity of edges detected in said sampled portion with a predefined range of quantity values representative of a quantity of edges in said identifying feature.

6. A method according to claim 1, wherein said second representation consists of a sequence of n values, $S_1$ to $S_n$, and said step of normalizing said at least one portion of said second representation of said at least one other characteristic into a range from a beginning value, B to an ending value E, includes the substeps of: assigning a beginning value, B, to a first value, $V_1$ of said sequence of values, assigning an ending value, E to a last value, $V_n$ of said sequence of values, and assigning each intermediate value, $V_i$, in said sequence of values, a value according to the equation:

$$V_i = B + ((E-B)H((S_i - S_1)/(S_n - S_1))).$$

7. A method according to claim 6, wherein said comparing step includes the substeps of:

comparing each value, $V_i$, of said n values of said normalized sequence to a corresponding value of a predefined sequence of values representing said identifying feature;
   rejecting said object if any of said values, $V_i$ is greater than or less than a predefined tolerance of said corresponding value of said predefined sequence; and
   not rejecting said object if all of said values, $V_i$ are within said predefined tolerance of said corresponding value of said predefined sequence.

8. An apparatus for identifying an object having an identifying feature comprising:

means for creating a representation of said object;
   means for locating at least one feature in said representation of said object having a corresponding characteristic similar to said at least one characteristic of said identifying feature and means for creating a second representation of at least one other characteristic of said located feature, said means for locating further including means for sampling at least one portion of said representation of said object at a predefined position in said representation, said means for sampling including means for sampling at predetermined locations across said representation of said object in a predefined direction, said locations being spaced apart by a distance corresponding to at least one characteristic of said identifying feature, and means for creating said second representation of said sampled portion of said representation, said second representation including a representation of at least one other characteristic of said located feature;
   means for normalizing at least a portion of said second representation; and
   means for comparing said normalized second representation of said at least one other characteristic of said at least one feature to a predefined representation of a characteristic of said identifying feature.

9. An apparatus according to claim 8, wherein said distance is less than a dimension of said identifying feature in said predefined direction.

10. An apparatus according to claim 8, wherein said distance is less than one half a dimension of said identifying feature in said predefined direction.

11. An apparatus according to claim 8, wherein said least one portion of said representation of said object comprises a window having a substantially narrow width and a length substantially longer than said identifying feature in a corresponding direction in said representation of said object.

12. An apparatus according to claim 8, wherein said at least one characteristic includes a total quantity of edges in said sampled portion of said representation at a predefined position in said representation, and wherein said means for locating said at least one feature includes: means for comparing said total quantity of edges detected in said sampled portion with a predefined range of quantity values representative of a quantity of edges in said identifying feature.

13. A method for identifying an object having a barcode, said barcode having a first predefined characteristic and a second predefined characteristic, said method comprising the steps of:

1) creating a representation of said object;

2) locating at least one feature in said representation of said object having a characteristic similar to said first predefined characteristic of said barcode, the step of locating including the step of sampling at predefined locations across said representation of said object in a predefined direction, said locations being spaced apart by a distance corresponding to at least one characteristic of said bar code;

3) creating a representation of a second characteristic of corresponding to said second predefined characteristic;

4) creating a normalized representation of said second characteristic from said representation of said second predefined characteristic; and 5) comparing said normalized representation of said second characteristic to said second predefined characteristic of said barcode.

14. A method according to claim 13, wherein said first predefined characteristic includes the number of edges in a representation of said barcode along a predefined path, and said second predefined characteristic includes a list of locations of said edges along said predefined path.

15. A method according to claim 13, wherein said first predefined characteristic includes the number of edges of the same polarity in a representation of said barcode along a predefined path, and said second predefined characteristic includes a list of locations of said edges along said predefined path.

* * * * *